Feb. 7, 1961   H. J. WILLIAMS   2,970,601
AUTOMATIC SHUTOFF DEVICE
Filed Oct. 11, 1955   3 Sheets-Sheet 1

INVENTOR.
Harry J. Williams

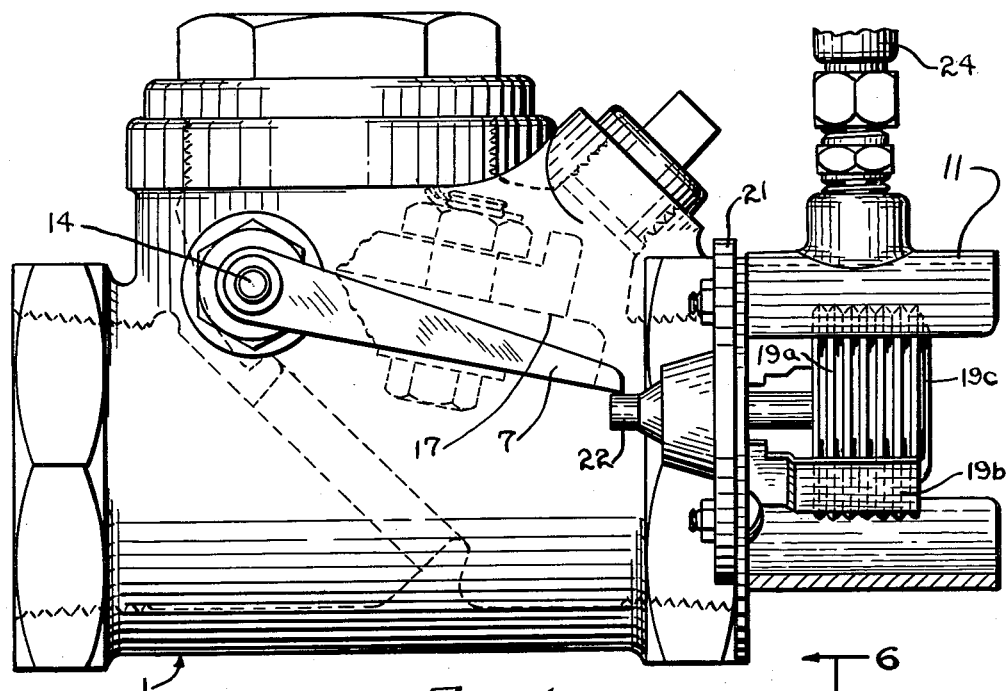
Fig. 4
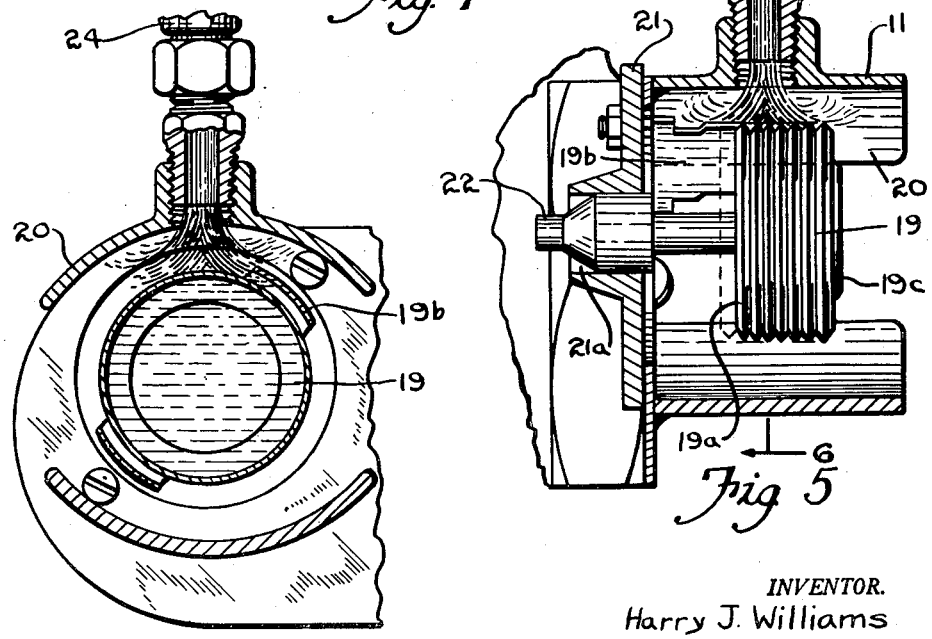
Fig. 6
Fig. 5
INVENTOR.
Harry J. Williams

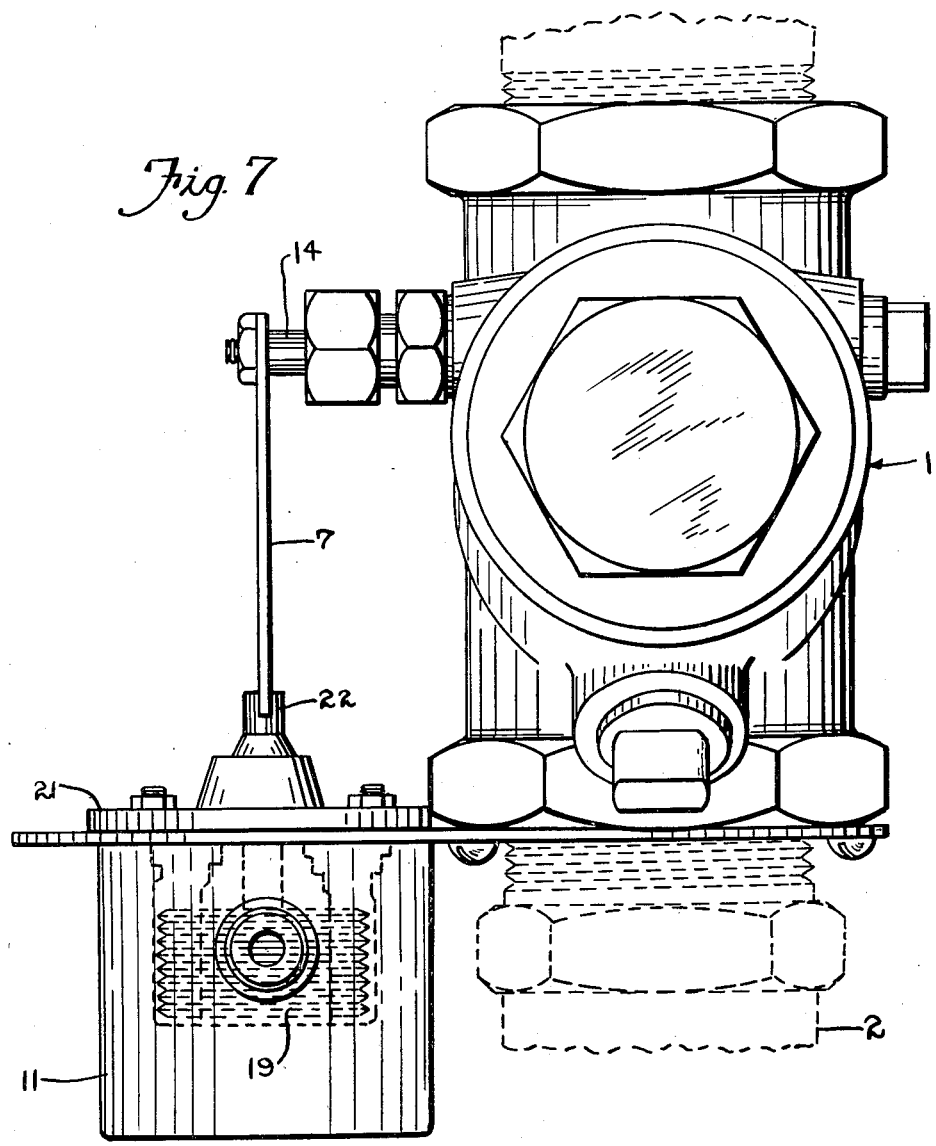

United States Patent Office 2,970,601
Patented Feb. 7, 1961

2,970,601
AUTOMATIC SHUTOFF DEVICE

Harry J. Williams, Elk City, Okla., assignor to The Bastian-Blessing Company, Chicago, Ill., a corporation of Illinois Filed Oct. 11, 1955, Ser. No. 539,721

12 Claims. (Cl. 137—13)

This invention relates generally to liquefied petroleum gas dispensing systems and more particularly to apparatus for terminating the flow of liquid into a tank when the liquid reaches a predetermined level.

Prior to the present invention, various means were proposed for terminating the flow of liquefied gas into a tank when a predetermined liquid level was attained. Aside from manual attention alone, which has many faults, conventional float actuated valves have been employed for this purpose. Although such are an improvement over manual, one disadvantage of float valves arises from the slack take-up present in mechanical linkages and their necessary operational lag. Because of these factors, float actuated valves were unable accurately to sense the level of the liquid and immediately cut off the flow when the desired level was reached. In addition, float valves must extend into the tank a substantial distance in order to be operative. This occupies space, is influenced by liquid agitation and splash, and the flow of liquid may be terminated before it reaches the optimum level.

The present invention is directed to an improved means utilizing the natural properties of liquefied gas itself for terminating the flow of replenishing liquid into a tank. The most obvious properties of liquefied gas are its high pressure and its tendency to expand or vaporize with a high degree of heat exchange when this pressure is diminished.

With the foregoing in mind, a primary object of the invention is to provide a liquid level control assembly by means of which the flow of feed liquid may readily be terminated with a high degree of accuracy in response to what may be generically termed an energy condition of the liquid itself, including its expansion.

A further object of the invention is to provide a device of the stated type in which the flow of liquid is effectively and efficiently terminated automatically and which is characterized by the absence of need for attention by servicing personnel.

A further object of the invention is to provide a novel construction in which a portion of the liquid in the tank is segregated from the mass of liquid and the expansion of this segregated portion is utilized for furnishing power to positively terminate the liquid feed. In the present instance, the tendency of the liquid of the segregated portion to expand under reduced pressure is used for this purpose.

A further object of the invention resides in the use of a liquid vaporizable at atmospheric pressure within the range of normal atmospheric temperatures to cause a pressure differential on opposite sides of a movable wall member as a source of power to release a self-closing valve.

The invention is also characterized by the use of the refrigerating effect of expanding liquefied gas as a source of power for actuating a valve closing means on the filler line of a liquefied gas storing system.

These being among the objects of the present invention, other and further objects will become apparent from the drawings and the description relating thereto and the appended claims.

Referring now to the drawings:

Fig. 4 is an elevational view, partly in section, of the valve of Fig. 3 shown in a position it assumes when open, and showing heat responsive means for releasably securing the valve in open position;

Fig. 5 is an elevational view, partly in section, of the heat responsive releasing means of Fig. 4 shown in the released or retracted position;

Fig. 6 is a vertical sectional view, taken substantially on line 6—6 of Fig. 5, and Fig. 7 is a top plan view of the construction shown in Fig. 4 with the connections therewith in Figs. 1 and 2 shown in dotted lines.

In the present invention, when the level of replenishing liquid reaches a certain height in a storage tank being filled, liquid is educted back out of the tank where it is expanded at atmospheric temperatures, and the expansion is converted into a pressure differential which moves the wall of an expansion chamber to release a latch holding a valve open in the filler line. When the latch is released, the valve closes within a very short period of time after the predetermined level is reached.

Figures 1, 2:
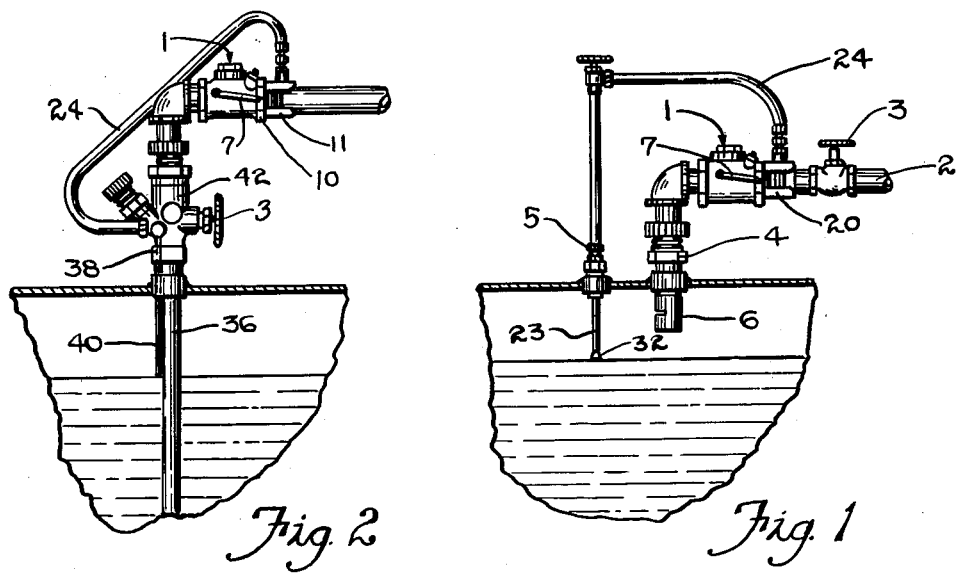
Fig. 1 is an elevational view of a liquid level control assembly made in accordance with the present invention and shown in conjunction with a filling apparatus.
Fig. 2 is an elevational view of a liquid level control assembly made in accordance with a modified form of the present invention.

Referring now to the drawings and more particularly to Fig. 1, the liquid level control assembly of the present invention indicated generally by reference numeral 1 is shown in operative relation to the tank filling apparatus. This apparatus includes a feed line 2 having a cut-off valve 3 and a filler valve 4 desirably of the type described and claimed in the Sundstrom Patent No. 2,713,874, issued July 26, 1955. The present liquid level control assembly is also shown in operative relation to a visual fill indicator 5, preferably of the type described and known as a slip tube gauge in the Buttner Patent No. 2,440,230, issued April 20, 1948. When the liquid has passed through the filler valve 4, it is then discharged into the interior of the tank by means of a valve 6 which desirably takes the form of a spray valve of the type set forth in an earlier filed application, Serial No. 527,522, filed August 10, 1955 by Poethig et al. now Patent No. 2,858,-219. In the present invention, the liquid level control assembly operates in response to a reduction in pressure and temperature caused by expansion of a portion of the liquid educted from the interior of the tank.

Figure 3:
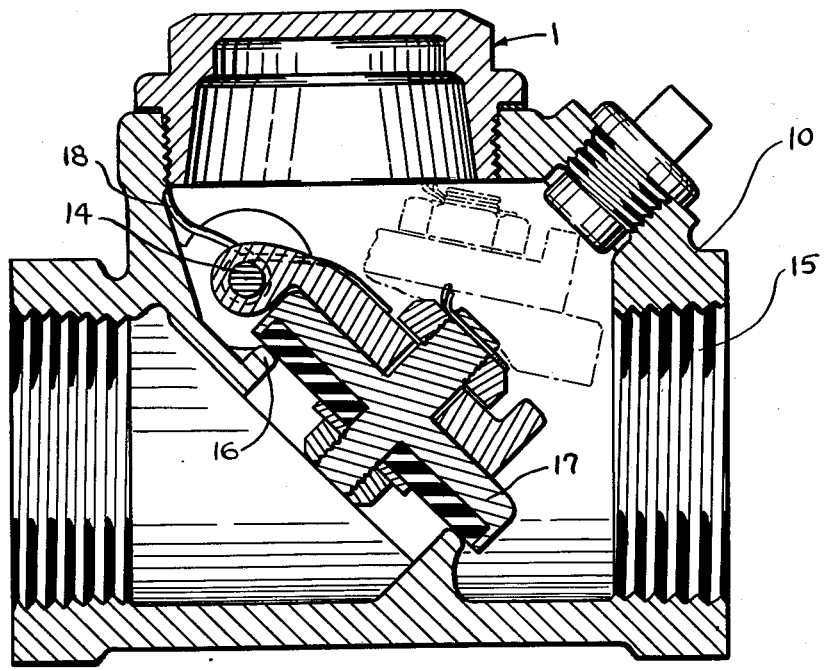
Fig. 3 is an elevational view, in section, of a valve forming a part of the liquid level control assembly of the present invention in closed position.

Referring now to Fig. 3 the control assembly 1 includes a valve 10 provided with a longitudinally extending bore 15 in which is formed an annular seat 16 for a flapper 17 which is mounted for rotation on a shaft 14 and is normally urged into the closed position shown in Fig. 3 by means of a spring 18. The flapper 17 is pivoted about the axis of the shaft 14 to the position shown in the dot-and-dash lines in that figure by an exteriorly positioned lever or handle 7 and is latched in that position by the present liquid level control assembly, as will be hereafter described. Forming a part of the present apparatus is a closure assembly 11 which is operative automatically to permit the valve 10 to close when the pressure within an expansible chamber 19, arranged in the path of flow of the incoming liquid, varies. In the present instance, the chamber 19 takes the form of a bellows which has a liquefied gas in it that in turn is actuated in response to a temperature change in its environment as when liquefied gas that is discharged from the slip tube gauge 5 is directed against the chamber 19 where it vaporizes with a refrigerating action. The bellows is mounted in place on the remote wall 19c by a bracket 19b so that its lower end 19a is free to move.

The control assembly 11 is arranged preferably next to the feed line 2 immediately upstream from the valve 10 where it lies in a protected position in close proximity to the handle 7. The assembly 11 (Fig. 5) includes a casing 20 to which is secured an end plate 21 having a central aperture 21a for reception of a short shaft 22 secured to the movable wall 19a of the bellows 19 in a position where it projects through the aperture 21a into the path of movement of the handle 7 at normal atmospheric temperatures. In this position the shaft 22 latches the flapper 17 in open position once the valve is moved to open position by manual actuation of the handle 7, as shown in Fig. 4. As the level of the liquid rises in the tank it ultimately reaches the bottom of the slip tube 23 of the gauge 5 and covers the opening therein. Liquid runs into the slip tube 23 under tank pressure and is conducted through the medium of a flexible conduit 24 into the interior of the casing 20 and ejected against the wall of the expansion chamber 19 where it expands and draws heat from the chamber 19 as it moves around the wall thereof. In fact, as shown in Fig. 5, the liquid emerges from the end of the restricted conduit 24 and passes into the interior of the casing 20 where it is confined to flow against the chamber 19 to generate power by expanding and absorbing heat from the bellows. Upon reduction of this temperature the fluid in the bellows liquefies correspondingly and the pressure within the chamber 19 is reduced so that the side walls of the bellows contract, the end wall 19a is retracted and the shaft 22 is urged to the right, as viewed in Fig. 5 to the position shown in that figure. In this position, the shaft 22 clears the leading edge of the lever 7 and permits rapid closing of the flapper 17 by means of the torsion spring 18. The slip tube 23 may be of fixed length (Fig. 2) or may be adjustable (Fig. 1) so that the level of the liquid at which closure of the valve takes place may be varied at will, depending generally upon atmospheric temperature.

In operation, the lever 7 is manually raised so that the end thereof urges the shaft 22 slightly to the right, as viewed in Fig. 4. As the end of the lever 7 clears the shaft 22 the shaft assumes the position shown in this figure. The position of the chamber 19 may be adjusted axially according to prevailing ambient temperatures so that this relationship is maintained. For instance, in very cold climates where the bellows would normally be contracted more than illustrated, the entire bellows may be moved axially to a position closer to the end plate 21. As the liquid rises in the tank, it enters the lower end of the slip tube 23 which is provided with a bell-shaped hood 32 to protect the liquid intake from the direct influence of the liquid sprayed from the valve 6 and to serve as a wide mouth funnel to prevent false indications of liquid that might otherwise enter the slip tube by capillary action. When the liquid emerges from the conduit 24 and passes into the closure assembly 11, it expands and gasifies and heat is absorbed from the chamber 19 which is positioned in the path of the expanding gases. The pressure within the chamber 19 consequently decreases and the entire bellows contracts. As the bellows contracts, the shaft 22 is moved to the right, as viewed in Fig. 4, until it just clears the edge of the lever 7. The spring 18 then takes over and positively returns the flapper to the closed position as shown in solid lines in Fig. 3. By this means the valve 10 is rapidly and efficiently closed by withdrawal of the shaft 22 in response to an energy condition of the liquid itself.

In Fig. 2 is shown a modified form of the present invention in which a filler valve 42 is employed in conjunction with a combined fill and eduction pipe 36. In this instance the conduit 24 is connected to the valve 42 which is provided with a passage 38, shown in dotted lines, communicating with a first tube 40 lying adjacent to the pipe 36. The passage 38 is, of course, isolated from the conventional central passage of the valve 42 and provides a path for the fluid to the conduit 24. By this arrangement the need for the slip tube 23 and a separate opening in the wall of the tank is obviated.

The liquid level control assembly of the present invention provides an efficient and effective cut-off of feed liquid when the level of liquid has reached the top of the tank. In both forms of the invention shown the tank may be filled substantially to a predetermined level and the flow of liquid is positively cut off when this level is reached.

Having thus described the invention and its operation it will be seen how the objects of the invention are attained. Moreover, it is to be noted that expanding the liquid to atmospheric pressure permits it to absorb all heat from the expansible chamber which is preferably made of metal having high heat conductivity to the end that the release of the lever 7 will be assured at all expected ambient temperatures. The heat being present in the expansible chamber assures the pressure differential developing when the liquefied gas begins to expand. If the casing 20 is substantially closed, expansion of the liquefied gas would provide pressure above atmospheric pressure on the outside of the bellows to augment the pressure differential effective with the bellows. Also, it will be noted that on up until the time liquid is educted through the slip tube, the temperature of the vapor flowing from the nozzle of the conduit 24 will gradually increase due to vapor compression during filling and will tend to warm the expansion chamber and secure the latching relationship. Then when liquid is educted, a goodly supply of latent heat will be present in the expansion chamber to assure vaporization even in very cold climates.

Consequently, it will be readily apparent to those skilled in the art that various and further changes can be made without departing from the spirit of the invention, the scope of which is commensurate with the appended claims.

What is claimed is:

1. An apparatus for filling a pressure storage tank to a predetermined level with liquefied gas in its liquid phase comprising a filler conduit, a normally closed valve in said conduit for controlling the flow of replenishing liquefied gas therethrough, means for opening said valve, latching means for holding said valve open including a temperature responsive element actuated by a drop in temperature below a predetermined temperature and a latching element normally extending into a position holding said valve open and retractible by said temperature responsive element when actuated to close said valve, and means for conducting and directing liquefied gas in its liquid phase into heat exchange contact with said temperature responsive element at said predetermined temperature but at a pressure below the vapor pressure of said liquefied gas to absorb heat therefrom, said temperature responsive member retracting said latching element to release said means for closing said valve only upon vaporization of liquefied gas in contact therewith.

2. An automatic shutoff device for filling storage containers to a predetermined level with liquefied gas under pressure comprising a filler valve having a filler passage and a valve element in said passage urged to its closed position, means for moving said valve element into its open position, and a closure control assembly for said valve element including a temperature responsive expansible chamber having means for engaging said first means to hold said valve element in its open position and operative upon actuation to release said first means, and means for actuating said expansible chamber including a conduit means extending to a point adjacent to the exterior surface of said expansible chamber and arranged to discharge liquefied gas in its liquid phase thereon at a pressure below the vapor pressure in liquefied gas to expand said gas and effect a reduction of the temperature of said chamber to close said valve element only when liquefied gas supplied to said conduit means is expanded over said exterior surface.

3. An automatic shutoff device for filling storage containers to a predetermined level with liquefied gas under pressure comprising a filler valve having a filler passage and a valve element in said passage biased to close in the path of flow of liquid in said passage, first means for moving said valve element into open position, means normally retaining said first means in open position including a temperature responsive element for releasing said first means to close said valve element, and a conduit extending to a point adjacent to said first means and arranged to discharge liquefied gas in both its vapor and liquid phases against said temperature responsive element at a pressure below the vapor pressure of said liquefied gas, said temperature responsive element being operative to close said valve element only in response to a drop in temperature from the temperature of said gas in its vapor phase discharged against it to the temperature induced by vaporization of said gas discharged against said temperature responsive element in its liquid phase.

4. An automatic shutoff device for filling storage containers to a predetermined level with liquefied gas under pressure comprising a filler valve having a filler passage and having a valve element in said passage biased to close in the path of flow of liquid in the said passage, latch means adapted to position said valve element in open position, and thermo-sensitive means for receiving liquefied gas in both its liquid and vapor phases including a conduit opening to the atmosphere and a thermo-sensitive element adjacent that end of said conduit which is open to atmosphere operative only in response to the chilling effect of the expansion of liquid gas discharged to the atmosphere from the conduit for releasing said latch means and closing said valve element.

5. An automatic shutoff device for filling storage containers to a predetermined level with liquefied gas under pressure comprising a filler valve having a filler passage, a normally closed valve element in said passage for controlling the flow of replenshing liquefied gas therethrough, a valve closing assembly for said valve element having an expansible chamber member externally exposed to a pressure less than the rated vapor pressure of said liquefied gas at a predetermined prevailing temperature, latch means operable by said chamber member, and means for directing liquefied gas against the external surface of said chamber member in its liquid phase for actuating said chamber and releasing said latch for inducing automatic closing of said valve only when the gas in its liquid phase is expanded over the external surface of the said chamber member and effects thereby a reduction in the temperature of said chamber member.

6. An automatic shutoff device for filling storage containers to a predetermined level with liquefied gas under pressure comprising a filler valve having a filler passage and a biased closed valve element in said passage, a valve element control assembly having a temperature responsive expansible chamber externally exposed to atmosphere, means for feeding liquefied gas in both its vapor and liquid phases externally against said expansion chamber at atmospheric pressure, said chamber being of a nature that it will be chilled sufficiently to contract when liquefied gas in its liquid phase is being fed and is vaporizing thereagainst but will not be chilled sufficiently to contract when the feeding of liquefied gas is in the vapor phase, and latch means connected to the chamber and maintaining said valve element open, said latch means being operable by contraction of said chamber to effect closing of said valve element when the temperature of said chamber is lowered a predetermined amount.

7. An automatic shutoff device for filling storage containers to a predetermined level with liquefied gas under pressure comprising a filler valve having a filler passage for replenishing liquefied gas, a valve element in said passage closing in the direction of flow of replenshing liquid flowing in the passage, manually operable means for moving said valve element into an open position against said flow of replenishing liquid in the passage, a control assembly latch means for holding said valve open and releasable to close said valve and including a sealed thermally sensitive expansible chamber externally exposed to the atmosphere for operating said latch means upon pressure variations within said chamber induced by changes in temperature of said chamber, and means for ejecting liquefied gas in both its liquid and vapor phases against said chamber so as to effect a reduction of the temperature of said chamber only when the ejected liquid vaporizes in contact with said chamber for actuating said latch means to close said valve.

8. A method for controlling the flow of liquefied gas into a storage tank comprising the steps of manually conducting a column of liquefied gas in its liquid phase to said tank, normally educting liquefied gas in its vapor phase from the tank and educting liquefied gas in its liquid phase from the tank when it has been filled to a predetermined level, expanding such educted liquefied gas in its liquid phase to effect a change of state from liquid to vapor, sensing such change in state and terminating the flow of said column when such change in state is sensed.

9. An automatic shutoff device for filling storage containers to a predetermined level with liquefied gas under pressure comprising a filler valve having a filler passage, a valve element in said passage, spring means for biasing said valve element to its closed position so as to shut off the flow of liquefied gas through the passage, means for opening said valve element, temperature responsive means normally exposed to a temperature above the boiling point of said liquefied gas for holding said valve element open, and means for directing the flow of liquefied gas in its liquid phase at a pressure below its vapor pressure against said temperature responsive means in heat exchange relationship therewith to vaporize same and reduce the temperature of said temperature responsive means, said temperature responsive means releasing said valve element to close it only when the temperature of the temperature responsive means is reduced by said liquefied gas vaporizing in heat exchange relationship therewith.

10. An automatic shutoff device for filling storage containers to a predetermined level with liquefied gas under pressure comprising a filler valve having a filler passage, a normally closed valve element in said passage disposed in the path of flow of the liquid in the said passage, means for moving said valve element into its open position, a latching assembly for holding said valve element in its open position including an expansible chamber member responsive to variations in its temperature, and means for directing a flow of said gas in its liquid phase against said expansible chamber member at a pressure below the vapor pressure of said liquefied gas to vaporize same and reduce the temperature of said chamber member to release said valve element for it to close only when the directed liquid vaporizes in heat exchange relationship with said chamber member.

11. A device for filling storage containers with liquefied gas under pressure, an automatic shutoff filler valve having a filler passage, a normally closed valve element in said passage adapted to be opened manually, means for moving said valve element into an open position, latch means including a thermal sensitive element for latching said first means with the valve element in open position, a conduit for receiving liquefied gas in its liquid phase and directing it into heat exchange contact with said thermal sensitive element at a pressure less than the vapor pressure of said liquefied gas to absorb heat from said thermal sensitive element to vaporize said liquid and chill said thermal sensitive element to effect movement of said thermo-sensitive element and release said first means to permit closing of said valve element only when said liquid is vaporized in heat exchange contact with said thermal sensitive element.

12. A method for controlling the flow of liquefied gas into a storage tank comprising the steps of manually conducting a column of liquefied gas in its liquid phase to said tank, normally educting liquefied gas in its vapor phase from the tank and educting liquefied gas in its liquid phase from the tank when it has been filled to a predetermined level, expanding such educted liquefied gas in its liquid phase to effect a change of state from liquid to vapor, sensing such change in state and terminating the flow of said column when such change in state is sensed, said flow being terminated in response to the latent heat of vaporization necessary to cause such change in state.

References Cited in the file of this patent

UNITED STATES PATENTS

| | | |
|---|---|---|
| 1,479,789 | Collin | Jan. 8, 1924 |
| 1,789,082 | Pfeiffer | Jan. 13, 1931 |
| 2,195,387 | Schlumbohm | Mar. 26, 1940 |
| 2,290,838 | White | July 21, 1942 |
| 2,340,936 | Cook | Feb. 8, 1944 |
| 2,376,628 | Shanley | May 22, 1945 |
| 2,451,559 | Kirkby | Oct. 19, 1948 |
| 2,492,365 | Miller | Dec. 27, 1949 |